United States Patent Office 3,480,960
Patented Nov. 25, 1969

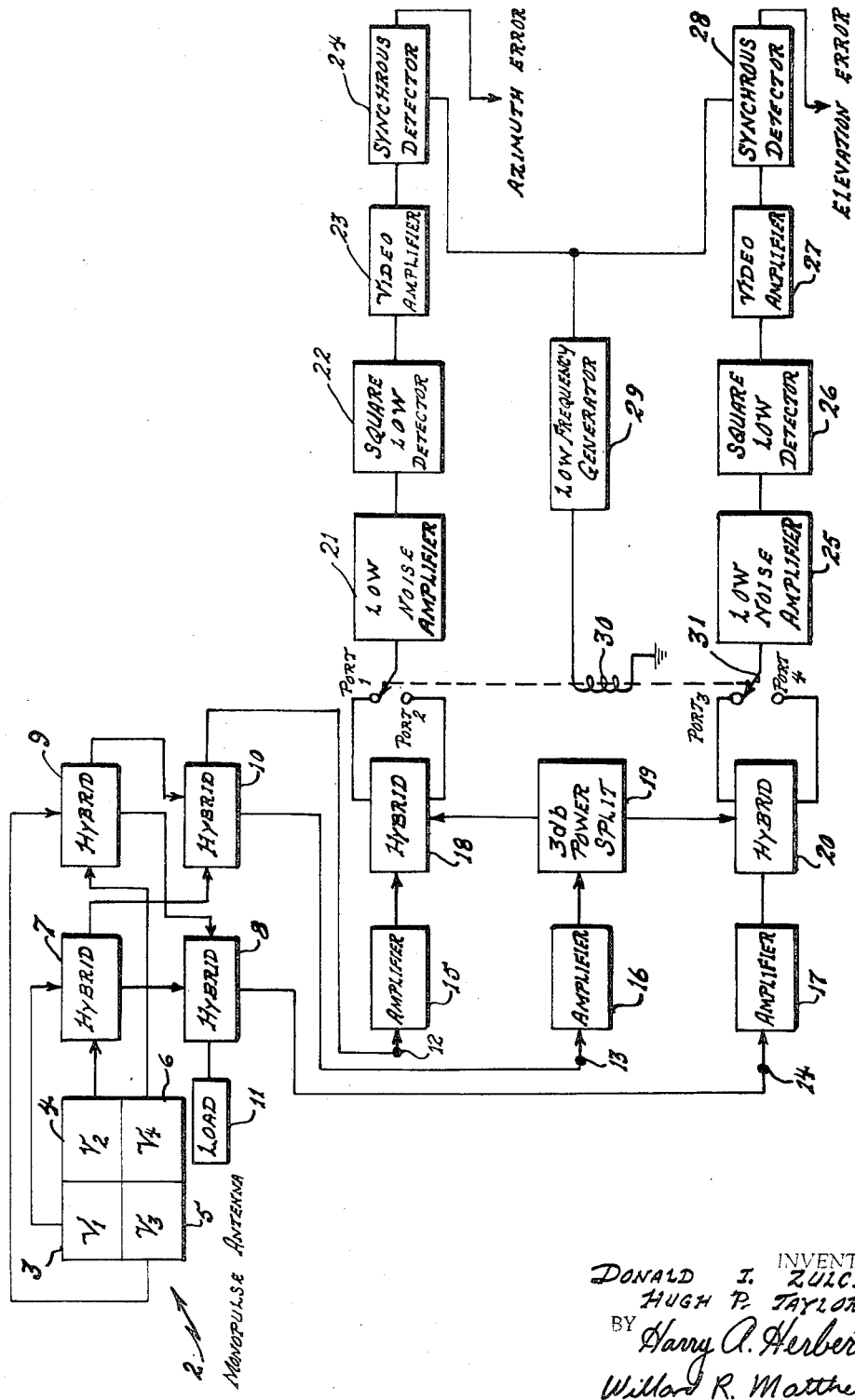

3,480,960
RADIOMETRIC MONOPULSE RECEIVER SYSTEMS
Donald I. Zulch, Oneida, N.Y., and Hugh P. Taylor, Cochituate, Mass.; said Zulch assignor to the United States of America as represented by the Secretary of the Air Force
Filed Aug. 30, 1968, Ser. No. 756,525
Int. Cl. G01s 5/04
U.S. Cl. 343—119
6 Claims

ABSTRACT OF THE DISCLOSURE

The invention is an improved monopulse radar receiver. The azimuth and elevation error signals and the sum reference signal received from a conventional monopulse antenna and hybrid junction circuit are recombined to provide sum and difference signals for the azimuth error and reference signals and for the elevation error and reference signals. A radiometer detector alternately samples the sum signals and difference signals by means of a synchronously operated switch and provides outputs responsive to the azimuth and elevation error signals. In a preferred embodiment, amplification is provided for the sum reference signal.

BACKGROUND OF THE INVENTION

This invention relates to radar systems and more particularly to a monopulse radar receiver having radiometric signal resolving means.

The conventional monopulse radar receiver has a four horn antenna that is directed toward a target. The amounts of electromagnetic energy received from the target by each element or horn of the antenna are compared to determine target position relative to antenna bore sight. The total energy received is summed to indicate target range. The difference between summed signals from vertically adjacent horns provides an azimuth error signal (indicating how far the target is to the right or left of antenna bore sight) and the difference between summed signals from horizontally adjacent horns provides an elevation error signal (indicating how far the target is above or below antenna bore sight). The sense of the resultant signal in each case indicates the target direction from bore sight. A total of four hybrid junctions generate the sum signal, the azimuth error signal and the elevation error signal. State of the art monopulse systems employ three channels, a sum channel that indicates range and consists of a local oscillator, mixer, IF amplifier, amplitude detector and video amplifier; an elevation angle channel that consists of a local oscillator, mixer, IF amplifier and a phase sensitive detector; and, an azimuth angle channel that also consists of a local oscillator, mixer, IF amplifier and phase sensitive detector. Monopulse radar systems are described in detail in the text Introduction to Monopulse by Donald Rhodes, published in 1959 by McGraw-Hill Book Company. The current state of the art is summarized in U.S. Patent 3,239,836, entitled Simplified Monopulse Radar Receiver, by C. F. Chubb et al., issued Mar. 8, 1966.

The major difficulties with the conventional monopulse approach are associated with the multiplier circuit, which is usually a phase detector configuration using the sum channel output as a reference and the difference channel output as a signal. In general, the multiplier diodes will remain balanced only over a small dynamic range of outputs and thus a boresight bias error is introduced as a function of signal source level. This is a major problem in applications where it is desired to operate on signal levels for which the predetection signal to noise ratio is less than unity. Furthermore, the multiplier circuit is sensitive to differential phase shifts between amplifier channels, and depending upon the quality of the depth of null of the hybrid network, the system sensitivity can be limited by amplifier phase stability rather than system noise.

SUMMARY OF THE INVENTION

The present invention comprehends replacing the sum, elevation and azimuth signal processing channels of a conventional monopulse radar receiver with a novel broadband correlator and a radiometer. A principal feature of the receiver is the introduction of the broadband correlator between the monopulse hybrid circuit and the multiple channel receiver amplifiers. The correlator preferably includes sum channel distribution amplifiers having a minimum of 6 db gain to take into account the sum channel contribution to all three receiver channels. It performs an algebraic sum and difference of the monopulse hybrid output signals to obtain the three pairs of output signals:

$\Sigma+\Delta$ elevation, $\Sigma-\Delta$ elevation, $\Sigma+\Delta$ azimuth, $\Sigma-\Delta$ azimuth, and $2\Sigma$ and noise.

The elevation and azimuth signal pairs are used as inputs to a time sampling receiver for further R.F. amplification and square law detection. The detected output is obtained as a square wave signal at the switching rate in which the first half cycle has an amplitude proportional to $(\Sigma+\Delta_i)^2$ and the second half cycle has an amplitude proportional to $(\Sigma-\Delta_i)^2$. This signal is further filtered and synchronously detected to obtain the desired product term $$(\Sigma+\Delta_i)^2-(\Sigma-\Delta_i)^2=4\Sigma\Delta_i$$

A single square law detector element is used which eliminates the problem of providing matched diodes. The sum signal pair $2\Sigma$ is also available for processing, for purposes of developing A.G.C., and for other data taking requirements.

It is a principal object of the invention to provide a new and improved monopulse radar receiver system that employs a radiometer as an error signal processing means.

It is another object of the invention to provide an improved monopulse radar receiver that does not require balanced detectors.

It is another object of the invention to provide an improved monopulse radar receiver that does not require amplifiers having matched gain and phase.

It is another object of the invention to provide an improved monopulse radar receiver having an increased dynamic range of operation.

It is another object of the invention to provide an improved monopulse radar receiver that requires only two unmatched receiver channels.

It is another object of the invention to provide an improved monopulse radar receiver that has a large bandwidth and has improved angular accuracy.

These, together with other objects, advantages and features of the invention will become more apparent from the following detailed description when taken in conjunction with the illustrative embodiment in the accompanying drawings.

DESCRIPTION OF THE DRAWING

The sole figure of the accompanying drawing is a simplified block diagram of one presently preferred embodiment of the invention.

DESCRIPTION OF THE PREFERRED EMBODIMENT

For a more complete understanding of the present invention, reference should be had to the following specification and to the accompanying block diagram. There is disclosed therein a conventional four-horn monopulse radar antenna 2 and its associated hybrid circuitry comprising hybrid junctions 7, 8, 9 and 10. Hybrid junction 8 is provided with a dummy load 11 for its unused port. This hybrid circuit is a conventional monopulse radar circuit and is effective to provide certain sum and difference signals from signals received by antenna horn elements 3, 4, 5 and 6. It is assumed for purposes of description that antenna horn elements 3, 4, 5 and 6 receive signals $V_1$, $V_2$, $V_3$, and $V_4$ respectively. The hybrid junction circuit output terminals 12, 13 and 14 then provide azimuth error signal $$\left[\frac{(V_1-V_2)+(V_3-V_4)}{4}\right]^2$$

(terminal 12), elevation error signal $$\left[\frac{(V_1+V_2)-(V_3+V_4)}{4}\right]^2$$

(terminal 14) and sum signal $$\frac{(V_1+V_2+V_3+V_4)^2}{4}$$

(terminal 13). These sum and difference signals are amplified in accordance with the principles of the invention by amplifiers 15, 16 and 17. It is not essential to the operation of the monopulse receiver herein disclosed that any of these amplifiers be used. However, in the preferred embodiment amplification of the sum channel signal by amplifier 16 has been found to provide optimum performance. Further recombining of the signals thus obtained is provided by means of a second hybrid junction circuit comprising hybrid junctions 18 and 20 and power splitting junction 19. This second hybrid junction circuit performs the following algebraic sum and difference functions.

Port 1:

$$\left(\frac{K_1}{8}\right)\left[\left(\sqrt{\frac{K_2}{K_1}}+1\right)^2(V_1+V_3)^2\right.$$
$$+\left(\sqrt{\frac{K_2}{K_1}}-1\right)(V_2-V_4)^2$$
$$\left.+2\left(\sqrt{\frac{K_2}{K_1}}+1\right)\left(\sqrt{\frac{K_2}{K_1}}-1\right)(V_1+V_3)(V_2+V_4)\right]$$

Port 2:

$$\left(\frac{K_1}{8}\right)\left[\left(\sqrt{\frac{K_2}{K_1}}+1\right)^2(V_2+V_4)^2\right.$$
$$+\left(\sqrt{\frac{K_2}{K_1}}-1\right)(V_1+V_3)^2$$
$$\left.+2\left(\sqrt{\frac{K_2}{K_1}}+1\right)\left(\sqrt{\frac{K_2}{K_1}}-1\right)(V_1+V_3)(V_2+V_4)\right]$$

Port 3:

$$\left(\frac{K_3}{8}\right)\left[\left(\sqrt{\frac{K_2}{K_3}}+1\right)^2(V_1+V_2)^2\right.$$
$$+\left(\sqrt{\frac{K_2}{K_3}}-1\right)^2(V_3+V_4)^2$$
$$\left.+2\left(\sqrt{\frac{K_2}{K_1}}-1\right)\left(\sqrt{\frac{K_2}{K_3}}-1\right)(V_1+V_2)(V_3+V_4)\right]$$

Port 4:

$$\left(\frac{K_3}{8}\right)\left[\left(\sqrt{\frac{K_2}{K_3}}+1\right)^2(V_3+V_4)^2\right.$$
$$+\left(\sqrt{\frac{K_2}{K_3}}-1\right)^2(V_1+V_2)^2$$
$$\left.+2\left(\sqrt{\frac{K_2}{K_1}}+1\right)\left(\sqrt{\frac{K_2}{K_3}}-1\right)(V_1+V_2)(V_3+V_4)\right]$$

where $K_1$, $2K_2$, and $K_3$ represent the noise power of amplifiers 15, 16 and 17, respectively.

A radiometer detector channel is provided to process both azimuth and elevation error signals. The azimuth error detector channel comprises low noise amplifier 21, square law detector 22, video amplifier 23 and synchronous detector 24. The elevation error detector channel comprises low noise amplifier 25, square law detector 26, video amplifier 27 and synchronous detector 28. These detector channels periodically sample the signals at output ports 1, 2, 3 and 4 by means of gang operated switch 31, low frequency generator 29 and actuating solenoid 30. Radiometer detectors of the type comprehended by this invention are described in detail in the technical publication entitled The Radiometer Equation by Hugh P. Taylor, published in the Microwave Journal, May 1967.

The input signal to the system is assumed to be divided equally between the four monopulse horns. The total power is $$V_1^2+V_2^2+V_3^2+V_4^2$$

or rewritten in another form $$(\alpha_1+\alpha_2+\alpha_3+\alpha_4)V_S^2$$

where $V_S$=the total input power divided up in the horns by $\alpha_1$, $\alpha_2$, $\alpha_3$, $\alpha_4$, these terms having an angular dependence. It will be assumed for the rest of the discussion that $\alpha_1=\alpha_2=\alpha_3=\alpha_4$ at boresight, and that $$V_1^2+V_2^2+V_3^2+V_4^2=V_S^2=\alpha_1 V_S^2+\alpha_2 V_S^2+\alpha_3 V_S^2+\alpha_4 V_S^2$$

The following equation describes the power outputs for the output ports indicated (second hybrid).

Port #2–port #1 $=\sqrt{\frac{K_1 K_2}{2}}[(V_2+V_4)^2-(V_1+V_3)^2]$

Port #2–port #1 =

$$\frac{K_1 K_2}{2}(\alpha_2+\alpha_4-\alpha_1-\alpha_3+2\sqrt{\alpha_2\alpha_4}-2\sqrt{\alpha_1\alpha_3})V_S^2$$

port #4–port #3 $=\sqrt{\frac{K_3 K_2}{2}}(V_3+V_4)^2-(V_1+V_2)^2$

Port #4–port #3 =

$$\sqrt{\frac{K_3 K_2}{2}}(\alpha_3+\alpha_4-\alpha_1-\alpha_2+2\sqrt{\alpha_3\alpha_4}-2\sqrt{\alpha_1\alpha_2})V_S^2$$

It is to be noted that the receiver noise is applied to the resolvers by virtue of $K_1$, $K_2$, $K_3$. This noise power is assumed to be divided evenly between output ports.

The noise power at each output is equal to the gain weighted average value of the input noise powers. After square-law detection and combining in that order the voltage output of a balanced differential detector will have a zero mean or DC component. The fluctuating or AC component will, however, have a magnitude proportional to the sum of the incident noise powers. Thus the noise output power when referenced to the antenna input (normalizing on $K_2$) will be the gain weighted mean of the individual amplifier noise powers. That is:

$$P_{\text{out}}=P_1+P_2=K_2\left[\frac{K_1}{K_2}P_{N1}+P_{N2}\right]$$

normalizing on $K_2$ to refer the power to the equivalent input port gives:

$$P_{\text{in}}=\frac{P_{\text{out}}}{K_2}=\left[\left(\frac{K_1}{K_2}\right)P_{N1}+P_{N2}\right]$$

For purposes of evaluating performance with a noise signal input it is desirable to express the power levels in terms of an equivalent noise temperature; if, $$P_N=kT_N\beta=(F-1)T_0 k\beta$$

where:

$P_N$=noise power,
$k$=Boltzmann's constant, $\beta$=receiver bandwidth,
$T_N$=equivalent noise temperature,
F=receiver noise figure as normally defined.

The effective system noise figure can now be determined as:

$$F_S = \frac{P_{in}}{kT_0\beta} + 1 = \frac{1}{kT_0\beta}\left[\left(\frac{K_1}{K_2}\right)P_{N1} + P_{N2}\right] + 1$$

$$= \left[\left(\frac{K_1}{K_2}\right)(F_1-1) + F_2 - 1\right] + 1$$

$$= \frac{K_1}{K_2}(F_1-1) + F_2$$

This indicates that the effective performance of the two channels is essentially equivalent to that of a single channel having a gain $K_2$ and a noise figure as indicated. For $K_1=K_2$ and $F_1=F_2$ this reduces to the sum of the single channel noise figures.

The effective input signal-to-noise ratio referred to the input can now be determined for a given output error signal (port 2–port 1 or port 3–port 4) as:

$$\frac{S}{N}_{in} = \frac{\left(\frac{\sqrt{K_1K_2}}{2}\right)(\alpha_2+\alpha_4-\alpha_1-\alpha_3+2\sqrt{\alpha_2\alpha_4}-2\sqrt{\alpha_1\alpha_3})V_S^2}{k\beta T_0\left[\left(\frac{K_1}{K_2}\right)(F_1-1)+F_2-1\right]}$$

or in terms of equivalent signal and noise temperatures $$\frac{S}{N}_{in} = \frac{\left(\frac{1}{2}\right)\left(\sqrt{\frac{K_1}{K_2}}\right)(T_S)(\alpha_i+\alpha_j-\alpha_k-\alpha_m+2\sqrt{\alpha_i\alpha_j}-2\sqrt{\alpha_k\alpha_m})}{\left[\left(\frac{K_1}{K_2}\right)(F_1-1)+F_2-1\right](T_0)}$$

It is convenient to define a system figure-of-merit as the peak-to-peak value of the signal-to-noise ratio multiplied by the processing gain introduced by post-detection integration of the error signal normalized on the ratio of $V_S^2$ to $V_N^2$.

The peak-to-peak value of the signal-to-noise ratio is determined as:

$$\left(\frac{S}{N}\right)_{PP} = \left(\frac{S}{N}\right)_{(\alpha_i+\alpha_j=1)} - \left(\frac{S}{N}\right)_{(\alpha_k+\alpha_m=1)}$$

where $\alpha_i+\alpha_j+\alpha_k+\alpha_m=1$.

Thus:

$$\left(\frac{S}{N}\right)_{PP} = \left[\frac{2\sqrt{\frac{K_1}{K_2}}}{\left(\frac{K_1}{K_2}\right)(F_1-1)+F_2-1}\right]\left[\frac{T_S}{T_0}\right]$$

$$= \left[\frac{2}{\sqrt{\frac{K_1}{K_2}}(F_1-1)+\sqrt{\frac{K_2}{K_1}}(F_2-1)}\right]\left[\frac{T_S}{T_0}\right]$$

and $M=$ $$\frac{(\text{receiver constant})\left(\frac{S}{N}\right)_{PP}}{\left(\frac{T_S}{T_0}\right)} = \frac{2(\text{receiver constant})}{\sqrt{\frac{K_1}{K_2}}(F_1-1)+\sqrt{\frac{K_2}{K_1}}(F_2-1)}$$

Where the receiver constant is dependent on the slope of the signal-to-noise error or S-curve as it goes through zero, the detector law and is proportional to $\beta\tau$, where $\beta$ is the receiver bandwidth and $\tau$ is the post-detection integration constant.

$$\frac{T_{S(PP)}}{\Delta T_N} = M\left(\frac{T_{source}}{T_0}\right)$$

$$= \left[\frac{2M\sqrt{\beta\tau}}{\sqrt{\frac{K_1}{K_2}}(F_1-1)+\sqrt{\frac{K_2}{K_1}}(F_2-1)}\right]\left[\frac{T_{source}}{T_0}\right]$$

where:

$T_{S(PP)} = S_{(PP)}$
$\Delta T_N = N/\text{receiver constant}$
$T_S = T_{source}$
$M\sqrt{\beta\tau} = \text{receiver constant}$ $T_{S(PP)}$ and $\Delta T_N$ are conveniently measured and $K_1$, $K_2$, $F_1$, $F_2$, $\beta$ and $\tau$ are the design parameters of concern. This sensitivity is representative of a monopulse system.

This invention comprehends two specific configurations for the improved monopulse receiver. The accompanying drawing discloses the first configuration. The second configuration is identical except that amplifiers 15 and 17 are eliminated.

The first case is described by the equations above. The effective noise power output at any one port is equal to one-half the noise power output of the balance detected sum as obtained with the conventional monopulse. Due to sampling loss the effective signal power will be reduced by one-half. $T_S/\Delta T_N$ is therefore the same as conventional monopulse.

For the case where only the sum channel has an amplifier, the normalized difference signal is:

$$S = (\tfrac{1}{2})\sqrt{\frac{1}{K_2}}(\alpha_i+\alpha_j-\alpha_k-\alpha_m+2\sqrt{\alpha_i\alpha_j}-2\sqrt{\alpha_k\alpha_m})T_S$$

The peak-to-peak value of the signal after introducing the sampling loss is:

$$S_{PP} = T_S\sqrt{\frac{1}{K_2}}$$

The noise temperature referred to the normalizing point (normalizing factor of $K_2$ to be consistent with previous calculations)

$$N = \frac{(F_1-1)T_0}{2} + \frac{(F_2-1)T_0}{K_2}$$

The ratio of the peak-to-peak signal to the noise is:

$$\left(\frac{S}{N}\right)_{PP} = \left[\frac{\sqrt{\frac{1}{K_2}}}{\frac{F_1-1}{2}+\frac{F_2-1}{K_2}}\right]\frac{T_S}{T_0}$$

the M factor is:

$$M = \frac{M\sqrt{\beta\tau}}{\frac{F_1-1}{2}K_2+\frac{F_2-1}{K_2}}$$

For $K_2=1$ (amplifier gain=$2K_2$) and $F_1=F_2=F$ the M factor is:

$$M = \frac{M\sqrt{\beta\tau}}{(F-1)}$$

This corresponds to the optimum monopulse case with respect to sensitivity.

While the invention has been described in its preferred embodiment, it is understood that the words which have been used are words of description rather than of limitation and that changes within the purview of the appended claims may be made without departing from the true scope and spirit of the invention in its broader aspects.

What is claimed is:

1. A monopulse receiver system comprising a monopulse radar antenna, means for providing a sum reference signal, an azimuth error signal and an elevation error signal from signals received by said antenna, means for providing a sum signal and a difference signal of said reference signal and said azimuth error signal and a sum signal and a difference signal of said reference signal and said elevation error signal, radiometer detector means, and switching means effective to permit selected periodic sampling of said sum signals and said difference signals by said radiometer detector.

2. A monopulse receiver system as defined in claim 1 including means for amplifying said sum reference signal.

3. A monopulse receiver system as defined in claim 2 including means for amplifying said azimuth error signal and means for amplifying said elevation error signal.

4. A monopulse receiver system comprising a four element monopulse radar antenna, a first hybrid junction circuit connected thereto, said first hybrid junction circuit being adapted to combine signals received by said antenna elements to provide a reference signal consisting of the sum of all signals received by all antenna elements, an elevation error signal consisting of the difference between summed signals received by horizontally adjacent antenna elements and an azimuth error signal consisting of the difference between signals received by vertically adjacent antenna elements, a second hybrid junction circuit having first, second, third and fourth output ports connected to said first hybrid junction circuit, said second hybrid junction circuit being adapted to provide at said first output port the sum of said reference signal and said elevation error signal, at said second output port the difference between said reference signal and said elevation error signal, at said third output port the sum of said reference signal and said azimuth error signal, and at said fourth output port the difference between said reference signal and said azimuth error signals, a first radiometer detector channel responsive to elevation error signals, a second radiometer detector channel responsive to azimuth error signals, and switching means, said switching means being adapted to alternately connect said first radiometer detector channel to said first and second output ports and said second radiometer detector channel to said third and fourth output ports.

5. A monopulse receiver system as defined in claim 4 including an amplifier connected between said first hybrid junction circuit and said second hybrid junction circuit, said amplifier being adapted to amplify said reference signal.

6. A monopulse receiver system as defined in claim 4 including amplifier means adapted to amplify said reference signal, amplifier means adapted to amplify said elevation error signal and amplifier means adapted to amplify said azimuth error signal, said amplifier means being connected between said first and second hybrid junction circuits.

References Cited

UNITED STATES PATENTS

| 3,239,836 | 3/1966 | Chubb et al. | 343—16 X |
| 3,344,424 | 9/1967 | Hacker | 343—16 |

RICHARD A. FARLEY, Primary Examiner

RICHARD E. BERGER, Assistant Examiner

U.S. Cl. X.R.

343—16, 100, 120